United States Patent [19]

Arambepola

[11] Patent Number: 4,879,559
[45] Date of Patent: Nov. 7, 1989

[54] AZIMUTH PROCESSOR FOR SAR SYSTEM HAVING PLURALITY OF INTERCONNECTED PROCESSING MODULES

[75] Inventor: Bernard Arambepola, Colchester, United Kingdom

[73] Assignee: The General Electric Company p.l.c., London, United Kingdom

[21] Appl. No.: 233,251

[22] Filed: Aug. 17, 1988

[30] Foreign Application Priority Data

Aug. 17, 1987 [GB] United Kingdom ............... 8719395

[51] Int. Cl.$^4$ .......................... G01S 13/90; G01S 7/44
[52] U.S. Cl. ....................................... 342/25; 342/195
[58] Field of Search ................. 342/25, 179, 189, 195

[56] References Cited

U.S. PATENT DOCUMENTS

| | | | |
|---|---|---|---|
| 4,045,795 | 8/1977 | Fletcher et al. | 342/25 |
| 4,132,989 | 1/1979 | Arens | 342/25 |
| 4,227,194 | 10/1980 | Herman et al. | 342/25 |
| 4,471,357 | 9/1984 | Wu et al. | 342/25 |
| 4,594,593 | 6/1986 | Nohmi | 342/25 |

FOREIGN PATENT DOCUMENTS 0191979 11/1983 Japan ................................... 342/25

OTHER PUBLICATIONS

Di Cenzo, A. "A New Look at Nonseperable Synthetic Aperture Radar Processing", IEEE Trans Aerospace and Elec. sys. vol. 24, No. 3, May 88, pp. 218–224.

Primary Examiner—Thomas H. Tarcza
Assistant Examiner—Gilberto Barrón, Jr.
Attorney, Agent, or Firm—Spencer & Frank

[57] ABSTRACT

Synthetic aperture radar is a known system for producing a high resolution image of the terrain under a moving platform, in which the effect of a large antenna (which would give high resolution in the direction of travel (azimuth direction)) is synthesized by processing together with suitable phase shifts a large number of radar returns from a smaller antenna for which the footprints overlap.

In order to simplify the image processing task, which is preferably carried out at high speed and on the moving platform itself, according to the invention an azimuth processor comprises a plurality of data processing modules $35^1$–$35^{R/N}$, each associated with a different part of the (range line) samples of echo returns, for example, by virtue of being connected to successive sections $33^1$–$33^{R/N}$ of a shift register into which successive range lines are clocked. Each module $35^i$ includes a memory $39^i$ to store the sets of range line samples, a processing section $37^i$ to azimuth process the samples contained in the memory. To accommodate the range migration effect whereby the range of a point on the terrain varies between different echo returns as the platform moves relative to the terrain, adjacent modules are interconnected by links $49^i$ so that samples required for processing by a module and not contained in its memory may be obtained from another module.

12 Claims, 9 Drawing Sheets

AZIMUTH PROCESSOR FOR SAR SYSTEM HAVING PLURALITY OF INTERCONNECTED PROCESSING MODULES

This invention relates to radar systems.

More particularly the invention relates to radar systems suitable for producing a high resolution image of the terrain under a moving platform e.g. an aircraft or an earth satellite.

One known such system using the so-called synthetic aperture radar technique will now be described with reference to FIG. 1 of the accompanying drawings.

Referring to FIG. 1, the system comprises a radar carried on a moving platform 1 and looking sideways with respect to the path of motion 3 of the platform 1. As the platform 1 moves along the path, the radar periodically transmits a radar pulse which illuminates an area 5 of the terrain beneath the platform commonly referred to as the radar footprint, the echoes of the transmitted pulses being detected by the radar and processed to produce the required image.

As the platform 1 moves along the path 3 the footprint 5 moves along a strip 7 of the terrain referred to as the imaged swath, the direction along the length of the swath 7 being referred to as the azimuth direction and the direction across the width of the swath being referred to as the range direction.

The resolution of the image obtained in the range direction is primarily determined by the bandwidth of the transmitted radar pulses, a high resolution being obtained with high bandwidth pulse using known pulse compression techniques.

High resolution in the azimuth direction can in theory be obtained by using a footprint having a small dimension in the azimuth direction. However, since this requires a radar antenna of large aperture and hence large dimensions, it is impractical. Instead, a smaller antenna is used, and successive radar pulses are transmitted at intervals such that successive footprints overlap. The radar echo signals are first processed in any suitable known manner to obtain a range line signal from each echo signal, i.e. a signal comprising a number of successive samples which respectively comprise echoes from targets at successively greater ranges in the footprint for the corresponding transmitted radar pulse. The range line sample signals obtained for each set of overlapping footprints are then processed simultaneously and in this way an azimuth resolution comparable to that obtainable with an antenna of much larger size and aperture is obtained, the technique being called synthetic aperture radar (SAR).

It will be appreciated that the SAR technique requires a large amount of processing of radar echo data which has to be carried out at high speed, preferably in real time. Moreover, it is desirable to carry out the processing on the moving platform rather than at an earth station, to reduce the volume and rate of data transmitted down to earth. As a result, the design of an azimuth processor for an SAR radar system presents a considerable problem.

It is an object of the present invention to provide an azimuth processor for a synthetic aperture radar system having an architecture which simplifies the problem of designing such a processor.

According to the present invention, an azimuth processor for a synthetic aperture radar system comprises a plurality of data processing modules, each associated with a different set of range line samples of the radar echo signals, each module including a memory to store the sets of samples from M successive range lines and data processing means for processing the samples contained in the memory for producing azimuth processed range lines samples, and adjacent modules being interconnected so that samples required for processing by a module and not contained in its memory due to the range migration effect may be obtained from another module.

The provision of a plurality of data processing modules makes the practical realisation of the processor easier, and the interconnection of the modules enables the range migration effect to accommodated without the need for the sets of range line samples contained in the respective memories to overlap.

The sets of range lines samples may be groups of N successive samples.

Advantageously, control means is provided whereby successive sets of samples overwrite the oldest set of range line samples in the respective memories eg. the memories are organised so as to be functionally equivalent to memories in the form of the curved surface of a cylinder.

Preferably, shift register means is provided, different stages of which are associated with different processing modules, into which successive samples of successive range line signals are clocked in range order, the control means being such as to transfer the clocked in samples to overwrite the oldest samples in the respective memories and to transfer azimuth processed range line samples produced by the respective modules to a shift register means, which may be the same as the firstmentioned shift register means.

Advantageously a range migration interpolator is provided for each module, connected to receive samples from one or more module memories in range order. To interpolate along the range lines rather than along the first samples of M range lines, then along second samples of M range lines etc i.e. along azimuth lines, is advantageous since the same coefficients may be used for the interpolation for each range line, since the range migration curves are approximately parallel to each other.

Advantageously, each interpolator includes shift register means into which samples from the memories are clocked in range order. The use of the register means minimises memory accesses and assists in efficient processing. Multiply accumulators may be connected directly to stages of the shift register means.

Each interpolator shift register means may include an additional shift register means to store samples while samples are being transferred between the shift register means of different modules.

All these shift register means referred to may be implemented in hardware or in software.

The invention also provides an azimuth processor for a synthetic aperture radar system comprising: a shift register arrangement into which successive samples of successive range line signals are clocked in range order as data already in the shift register is clocked out, a plurality of data processing modules each associated with a different set of successive stages of the shift register, each processing module including a respective memory which stores range line samples of M successive range line signals and data processing means for processing the samples contained in the associated said memory at any given time to produce azimuth processed range line samples; and control means whereby after each range line has been clocked into the shift register arrangement in each module, the clocked in range line samples in said set of successive stages of the shift register overwrite the oldest range line samples in said memory and processed range line samples produced by said processing module are inserted into the shift register; adjacent ones of said processing modules being interconnected so that any unprocessed range line samples required for range migration interpolation by a module not stored in its associated memory may be obtained from another said module.

One synthetic aperture radar system incorporating an azimuth processor in accordance with the invention will now be described by way of example with reference to FIGS. 2 to 10 of the accompanying drawings in which.

Figure 1:
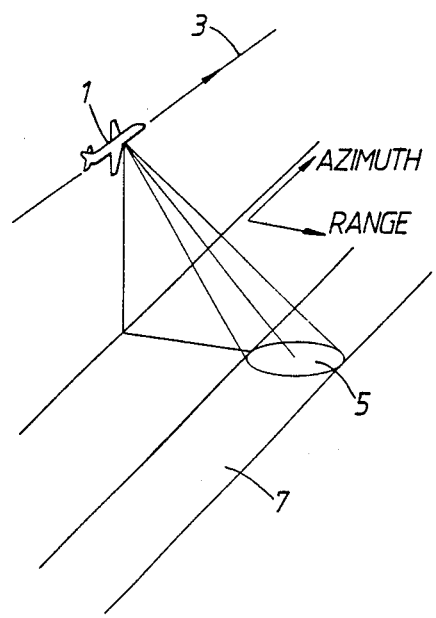
FIG. 1 is a diagram of an SAR system.
Figure 2:
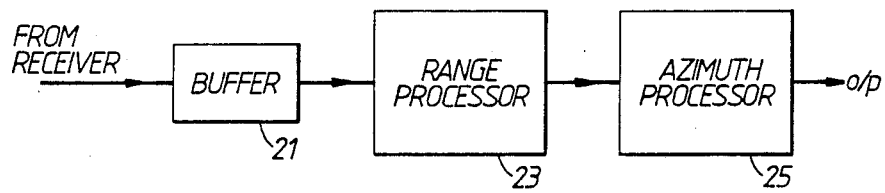
FIG. 2 is a block schematic diagram of the system.

Referring to FIG. 2, the echo signals received by the antenna (not shown) of the system are detected in a receiver (not shown) of conventional form and converted to digital data signals representing samples of the echo signals of complex form in range line order. The data samples are passed by way of a first in first out (FIFO) buffer 21 to a range processor 23, the buffer serving to smooth out the data rate over the inter pulse period.

In the range processor 23 the data signals are processed in conventional manner, e.g. when range compression techniques are used, by correlating each echo resulting from a transmitted pulse with a replica of the transmitted pulse, to produce a series of so-called range line signals. Each range processed range line signal comprises a series of R samples each relating to the echoes from a location at a different range from the antenna in the area of the footprint for the corresponding transmitted pulse, the R samples in each range line signal occurring in range order, with the shortest range sample first.

The range line signals at the output of the range processor 23 are then passed to an azimuth processor 25 where the signals for M successive range lines are processed simultaneously to provide image data having a relatively high resolution in the azimuth direction compared with the range line signals from the range processor 23. M is known as the azimuth integration interval and is chosen according to the required azimuth resolution. The maximum possible resolution is obtained when M is equal to the largest number of successive radar pulses whose footprints all overlap each other, lower resolution being obtained for smaller values of M.

Figure 3:
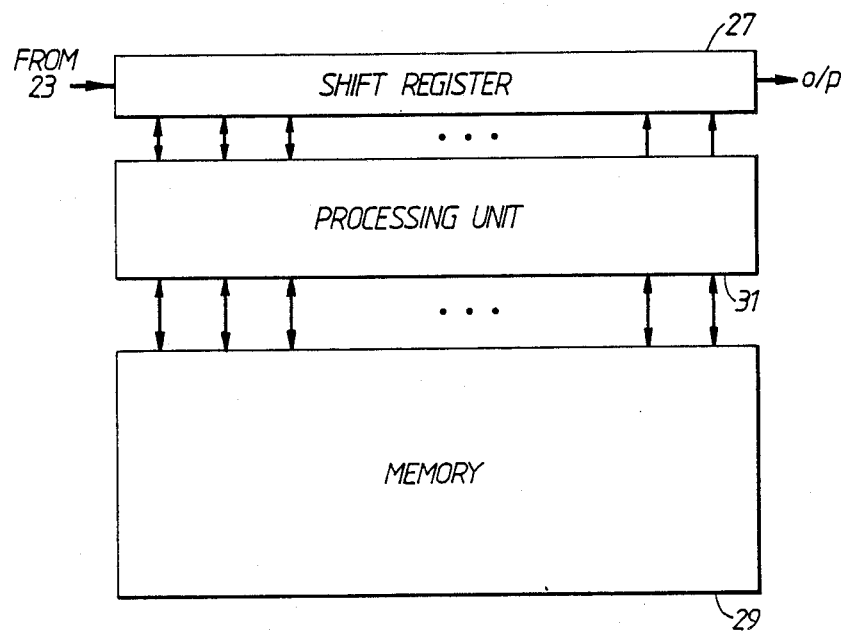
FIG. 3 is a block schematic diagram illustrating the basic organization of the azimuth processor.

Referring now to FIG. 3, the azimuth processor 25 includes an R-stage shift register 27, each stage being adapted to accommodate all the bits comprising a single range line signal sample. The shift register 27 is associated with a memory 29 capable of storing R x M range line samples and a processing unit 31.

Figure 4:
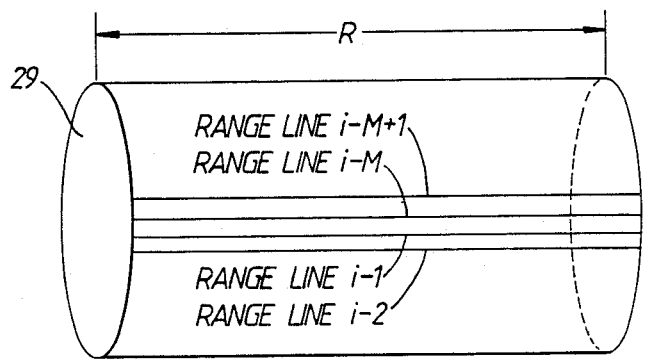
FIG. 4 illustrates the form of a data memory incorporated in the processor.

Referring to FIG. 4, the memory 29 is organised so as to be functionally equivalent to a memory in the form of the curved surface of a cylinder.

In operation data for each whole range line is clocked into the shift register 27 from the range processor 23 in turn.

During each processing cycle, which is the time between the start of clocking in of a range line, say line i, and the start of clocking in the next line i+1, the following operations occur.

First line i is clocked into the shift register 27 whilst at the same time processed data for range line (i−M−1) is clocked out of the shift register 27. At this time the memory 29 holds range lines (i−1) to (i−M) as illustrated in FIG. 4, and the processing unit 31 utilises this data to calculate processed data for range line (i−M). When this processing is complete, the data for range line i is transferred from the shift register 27 to the memory 29 where it overwrites the data for range line (i−M), and the data removed from the shift register 27 is replaced by processed data for line (i−M) from the processing unit 31.

The data for the next range line (i+1) is then clocked into the register 27 and the processed data for range line (i−M) is clocked out of the register 27, and the cycle repeated.

In an alternative arrangement of the azimuth processor 25 a shift register arrangement using two shift registers may be used, one for data input and the other for data output.

Figure 5:
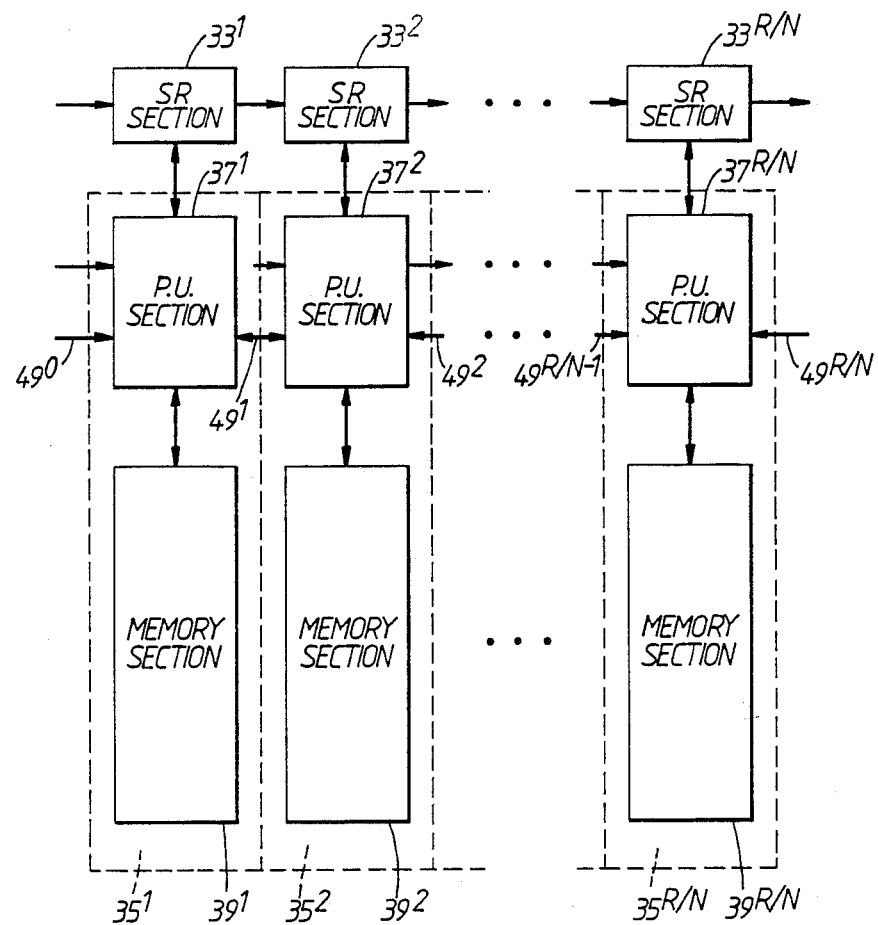
FIG. 5 is a block schematic diagram showing the organization of the azimuth processor in more detail.

Referring now to FIG. 5, in accordance with the invention, to facilitate design and confer other advantages as described in greater detail below, the azimuth processor 25 is partitioned into B blocks, each block primarily handling N data samples so that B=R/N. Thus, as shown in FIG. 5, the shift register 27 is divided into R/N sections $33^1$, $33^2$ ... $33^{R/N}$ each of which is associated with a respective one of R/N azimuth processing modules (APMs) $35^1$ to $35^{R/N}$ each of which comprises a respective one of R/N sections $37^1$ to $37^{R/N}$ of the processing unit 31 and a respective one of R/N sections $39^1$ to $39^{R/N}$ of the memory 29, each memory section 39 having the capacity to store N x M data samples. As further explained below, each processing unit section 37 is arranged to communicate data to and receive data from the processing unit section 37 of the each adjacent APM 35.

Figure 6:
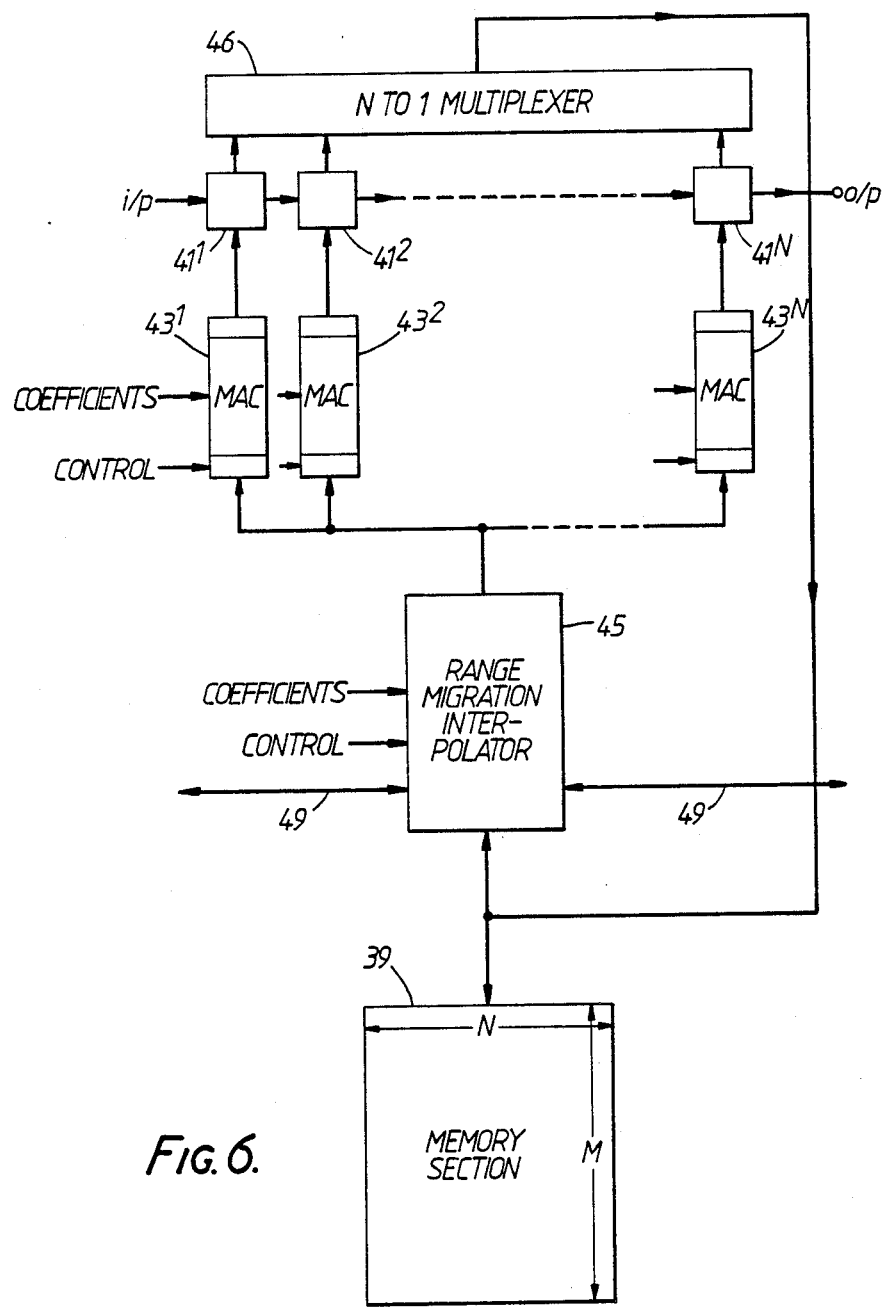
FIGS. 6 and 6a are a block schematic diagrams of an element of the processor.

Referring now to FIG. 6, each shift register section 33 includes N shift register stages $41^1$ to $41^N$ and the processing unit section 37 of each APM 35 comprises N complex multiplier accumulators (MACs) $43^1$ to $43^N$ each associated with a respective one of the N shift register stages 41. Each processing unit section 37 further includes a range migration interpolator 45 associated with all the MACs 43 of that section 37 and with the memory section 39 of that APM 35, and a multiplexer 46 via which data may be entered into the memory section 39 from the shift register section 33.

It will be understood that FIG. 6 is a functional block diagram only, and that the actual hardware implementation of FIG. 6 may involve multiplexing of some of the units shown. Thus, the MACs $43^1$ to $43^N$ may, for example, be replaced by a single complex multiplier accumulator N times faster than the MACs $43^1$ to $43^N$ or by N/P complex multiplier accumulator each of which implements the function of P of the MACs $43^1$ to $43^N$.

It should also be appreciated that FIG. 6 does not show a controller which generates appropriate control signals for controlling the operation of the various units.

The operation of the azimuth processing modules 35 will now be explained.

Figure 7:
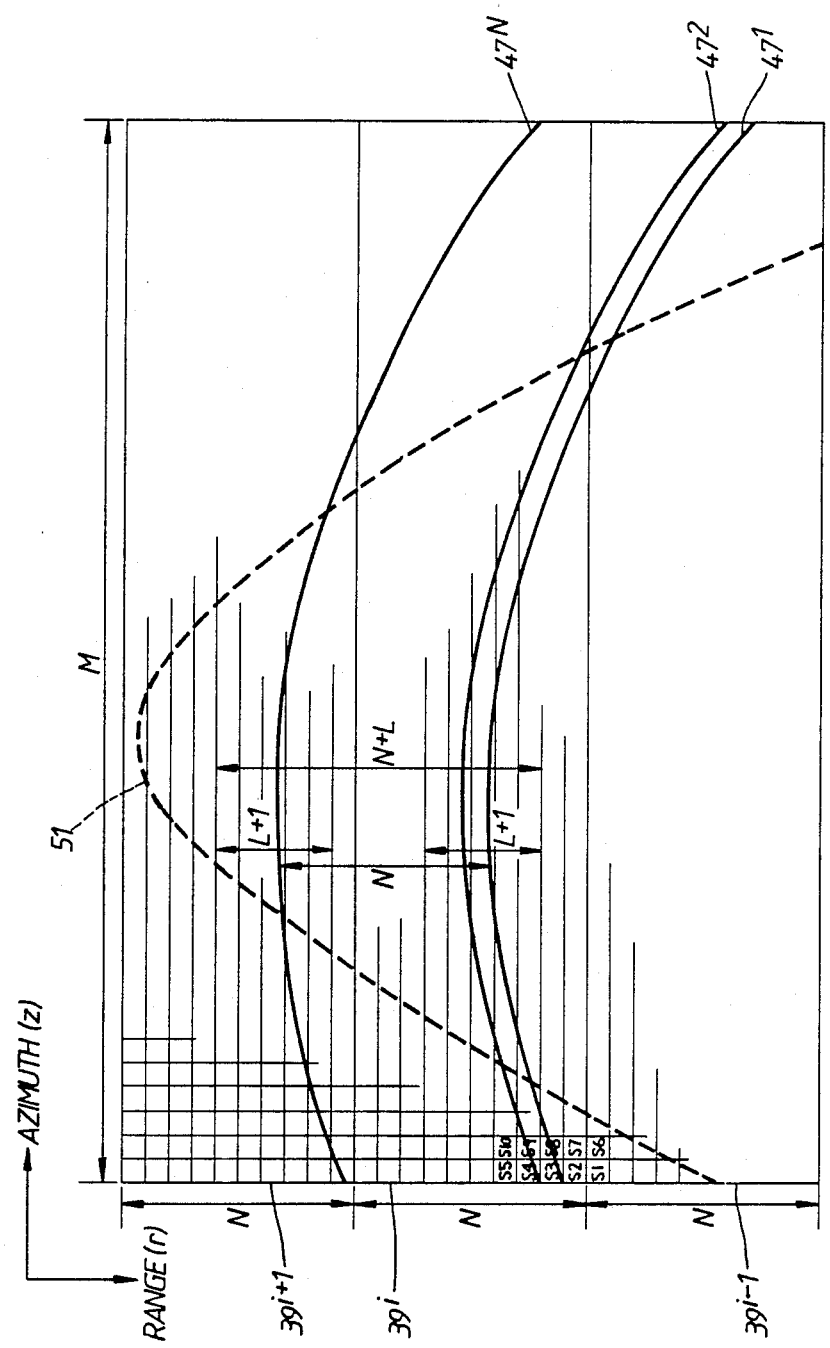
FIGS. 7 and 8 are diagrams illustrating the functions performed by various components of the processor element of FIG. 5.

As illustrated in FIG. 7 in respect of three adjacent memory sections $39^{i-1}$, $39^i$ and $39^{i+1}$, the contents of the memory section 39 of each APM 35 may be represented as a rectangular array of range line samples having dimensions N and M along range (r) and azimuth (z) axes respectively. Each MAC 43 is required to calculate processed data for subsequent insertion into the associated shift register stage 41. To this end, each MAC 43 carries out a weighted multiply-accumulate function on M samples of data. However, due to the fact that a given point on the terrain being imaged will be at a different range from the system antenna for different range lines, i.e. the so-called range migration effect, the relevant M samples for each multiply-accumulate function have to be computed so that the samples relate to points along one of curved lines $47^1$ to $47^N$ shown in FIG. 7 rather than to points along a straight line parallel to the z axis of the memory section 39.

The range migration interpolator 45 of each APM 35 operates in accordance with control signals to supply the required M samples to each MAC 43 of that APM.

To this end, each interpolator 45 first weights in accordance with applied coefficients several, say L+1, samples stored in respect of the first range line in the region of the range indicated by the curved line $47^1$ for MAC $43^1$, e.g. samples S1 to S5 for L=4, and uses the weighted samples to compute a first sample for MAC $43^1$. The interpolator 45 then similarly computes first samples for each of the other MACs, i.e. MAC $43^2$ to MAC $43^N$. The interpolator 45 then proceeds to compute second samples for each of the MACs $43^1$ to $43^N$, using for example for MAC $43^1$ the samples S6 to S10 stored in respect of the second range line, and so on, until each MAC $43^1$ to $43^N$ has its required M samples.

Each MAC $43^1$ to $43^N$ operates in accordance with applied control signals and weighting coefficients to weight the M samples received from the range migration interpolator 45 and compute processed data for subsequent insertion in the associated shift register stage 41 as described above.

It will be understood that the above operations are carried out in each APM 35 simultaneously in respect of the processed data required for the associated section 33 of the shift register 27.

It will be appreciated that during the above described operations of the range migration interpolators 45, each interpolator 45 will at times require data contained, not only in its own associated memory section, e.g. $39^i$ in FIG. 7, but also in the memory section $39^{i-1}$ or $39^{i+1}$ of a next adjacent APM 35. Such transfer of data is effected, under control of the control signals applied to the interpolators 45, via interconnections 49 between adjacent interpolators 45, as will now be further described.

Referring to FIG. 7, to interpolate for N samples in a particular range line, i.e. a z=constant line, an interpolator, say $45^i$, requires (N+L) samples in this line. These (N+L) samples will, in general, be distributed between the memory sections $39^{i-1}$, $39^i$ and $39^{i+1}$. The interpolator $45^i$ reads data only from its associated memory section $39^i$. If it requires data from the memory section $39^{i-1}$ (e.g. sample S1 or S6 referred to above) it obtains this data from interpolator $45^{i-1}$ via the interconnection $49^{i-1}$. Simultaneously, data similarly required by interpolator $45^{i+1}$ from the memory section $39^i$ is read by the interpolator $45^i$ from its memory section $39^i$ and transferred to the interpolator $45^{i+1}$ via the interconnection $49^i$. Alternatively, if the interpolator $45^i$ requires data from the memory section $39^{i+1}$ (e.g. to compute samples for MAC $43^N$ for all except the last few range lines) it obtains this data from the interpolator $45^{i+1}$ via the interconnection $49^i$. Simultaneously, the interpolator $45^i$ transfers data similarly required by interpolator $45^{i-1}$ from memory section $39^i$ to the interpolator $45^{i-1}$ via the interconnection $49^{i-1}$. Hence the interconnections 49 are, in general, required to be bidirectional, the direction of data transfer in these interconnections being set up by the controller (not shown) depending on the interpolator requirements.

Since each of the interpolators 45 require (N+L) samples for each z=constant line, there is an overlap of L samples for each of z=constant line between the input requirements of any two adjacent interpolators 45. To maximise processing efficiency it is necessary to ensure that every interpolator 45 generates the first sample of line z=k+1 immediately after generating the Nth sample of line z=k, i.e. so that the interpolators 45 are 100% efficient. This is achieved by providing L registers in each interpolator. Considering interpolator $45^i$, these L registers are used to retain the L samples of the overlap region between interpolators $45^i$ and $45^{i-1}$ of each z=k line, after use by interpolator $45^i$. These L samples are used by the interpolator $45^{i-1}$ later, e.g. to produce the $k^{th}$ sample for its associated MAC $45^N$, without accessing the memory section $39^i$. While the interpolator $45^{i-1}$ is using these samples of line z=k held in register, the interpolator $45^i$ reads the corresponding samples of the line z=k+1. Hence immediately following the generation of the Nth sample of the z=k line by interpolator $45^i$, i.e. the kth sample for its associated MAC $43^N$, L+1 samples of the line z=k+1 are available for interpolator $45^i$ to generate the first interpolated sample of line z=k+1.

Figure 6A:
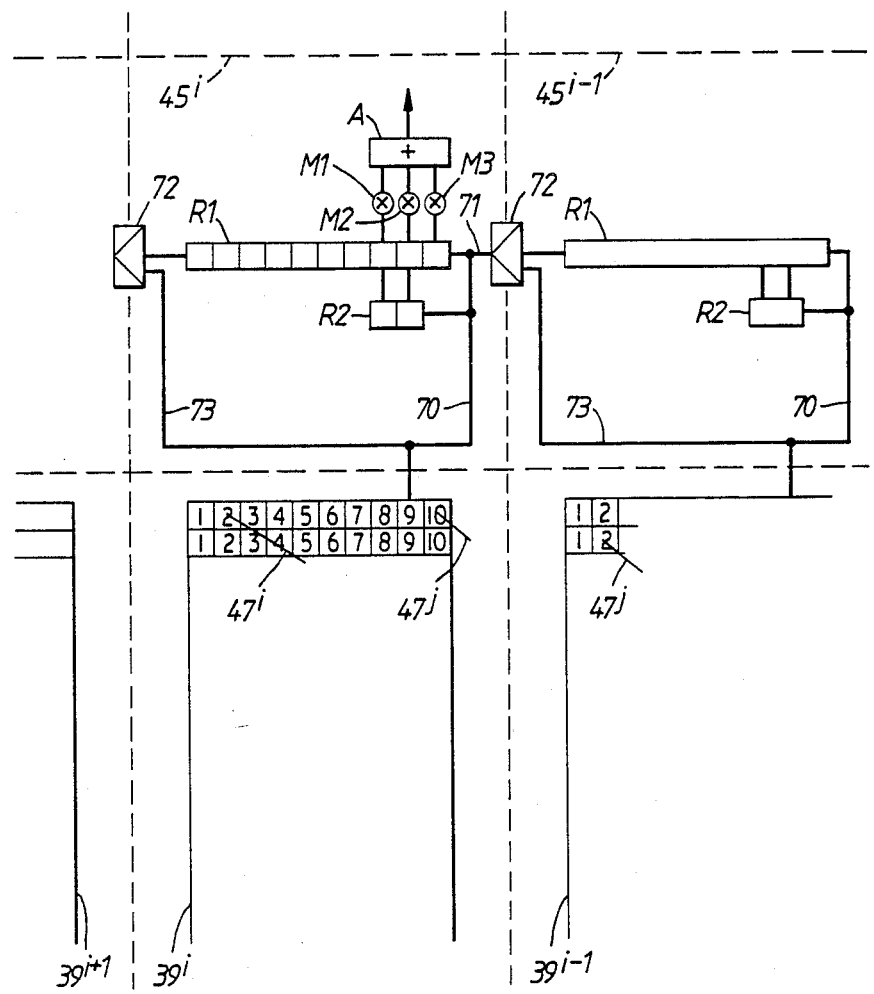

An example of the form which the registers in the interpolators could take and their operation, is now described with reference to FIG. 6a. To simplify the explanation, it has been assumed that N=10 and L=2, although L would normally be greater than 2. In clock cycle i, the sample in location 1 in the first row of memory $39i$ is transferred along link 70 and clocked into register R1. In clock cycle i+1, the sample in location 2 in the first row is clocked into register R1, and the first sample advances one space to the left and so on. Since L=2, only when three register locations have been filled can an interpolated sample be generated, and this will be generated in respect of the second sample from the first row of the memory.

Multipliers M1-M3 (L+1 are required) operate directly on these locations and the results are summed in an accumulator A. Consequently, after clock cycle i+2, the first interpolated sample is generated as the output of accumulator A. Further interpolated samples are generated in succeeding clock cycles.

To perform the weighted summation on sample 10 from the first row, which requires that sample 10 be in the register location connected to multiplier M2, it is apparent that the register location connected to multiplier M3 must contain sample 1 from the first row of memory $39^{i-1}$. Accordingly, before clock cycle i+10, switch means (not shown) disconnects link 70 from register R1 and connects link 71 from register R1 of interpolator $45^{i-1}$. Consequently, on clock cycle i+10, the first sample of the first row of memory $39^{i-1}$, which is by now contained in the location at the extreme left of register R1 of interpolator $45^{i-1}$ is clocked into the first location of register R1 of interpolator $45^i$. Thus, the weighted summation can be performed on sample 10.

Sample 10 is at this point contained in the storage location of register R1 which is connected to multiplier M2. Sample 10 is also required so that the weighted summation on sample 1 of the first row of memory $39^{i-1}$ can be performed. This requires sample 10 to be in the register location connected to multiplier M1 and sample 1 to be in register location connected M2 and sample 2 to be in register location connected to multiplier M3. Accordingly, on the next clock cycle the second sample of the first row of memory $39^{i-1}$ (now in the extreme left location of register R1 of interpolator $45^{i-1}$) is clocked along the link 71, and the weighted summation is performed on the first sample of the first row of the memory $39^{i-1}$.

In order to save clock cycles in the sense that a sample is read from memory $39^i$ on each clock cycle, on cycles i+10 and i+11, the first two samples of the second row of memory $39^i$ are read and stored in an additional shift register R2 of length L. After the weighted summation has been performed on sample 1 of row 1 of memory $39^{i-1}$, on clock cycle i+12, the samples in the additional shift register R2 are transferred simultaneously into register R1, at the same time as link 70 is restored and link 71 disconnected and the third sample of the second row of memory $39^i$ is clocked in.

Accordingly, at clock cycle i+12, the register locations connected to multipliers in M1-M3 will contain the first three samples of the second row of the memory $39i$, and a weighted summation can be performed on the second sample of this row. It will be remembered that the weighted summation on the first sample is performed by the interpolator next to the left.

Of course, due to the range migration curves eg. $47^i$ $47^j$, it may be that the first sample of the second row on which a weighted summation can be performed is the fourth, and not the second as in the first row. In this case, the last two samples of this row will in fact be made up by the first two samples of the second row of memory $39^{i-1}$.

Accordingly, the third and fourth samples of the second row are fed into the register R2 and the fifth samples is the first to be clocked in directly to the register R1. After the tenth sample has been clocked into register R1, the next two samples required are the first and second of second row of memory $39^{i-1}$. These are fed via link 71, via multiplexer 72 and link 73 of interpolator $45^{i-1}$ i.e. directly from memory $39^{i-1}$. The procedure is thereafter the same as for the first line.

It will be noted that a single output only is required from each memory 39, in that it is switched between register R1 and R2 of its own interpolator and register R1 of an adjacent interpolator. It will also be noted that a weighted summation i.e. a sample for MAC $43^1$–$43^N$ take place each clock cycle.

Where the curvature of lines 47 is such that each line 47 embraces less than or equal to $2N-L+1$ samples in the range direction, such data transfer is required only between immediately adjacent APMs 35. However, for lines 47 of greater curvature such as dotted lines 51 in FIG. 7, it will at times be necessary to obtain data not only from a next adjacent interpolator 45, but also from a next but one adjacent interpolator 45.

It will be appreciated that special arrangements will need to be made in respect of the APMs $35^1$ and $35^{R/N}$ handling the most and least distant samples of each range line signal. For example, the interconnection links $49^0$ and $49^{R/N}$ at the left hand end of APM $35^1$ and the right hand end of APM $35^{R/N}$ respectively may supply a fixed value to the interpolators $45^1$ and $45^{R/N}$ respectively, such as zero.

It will be understood that in theory the weighting coefficients required by the interpolators 45 are different for each z=constant line. However, in practice it is normally possible to update the weighting coefficients less frequently, i.e. use the same coefficient for several consecutive z=constant lines.

Similarly, since the azimuth weighting coefficients used by the MACs 43 in the APMs 35 are functions of range, a different set of weighting coefficients has, in theory, to be used for the MACs 43 in each of the APMs $35^1$ to $35^{R/N}$, but in practice the same coefficients may be used by several APMs.

Figure 9:
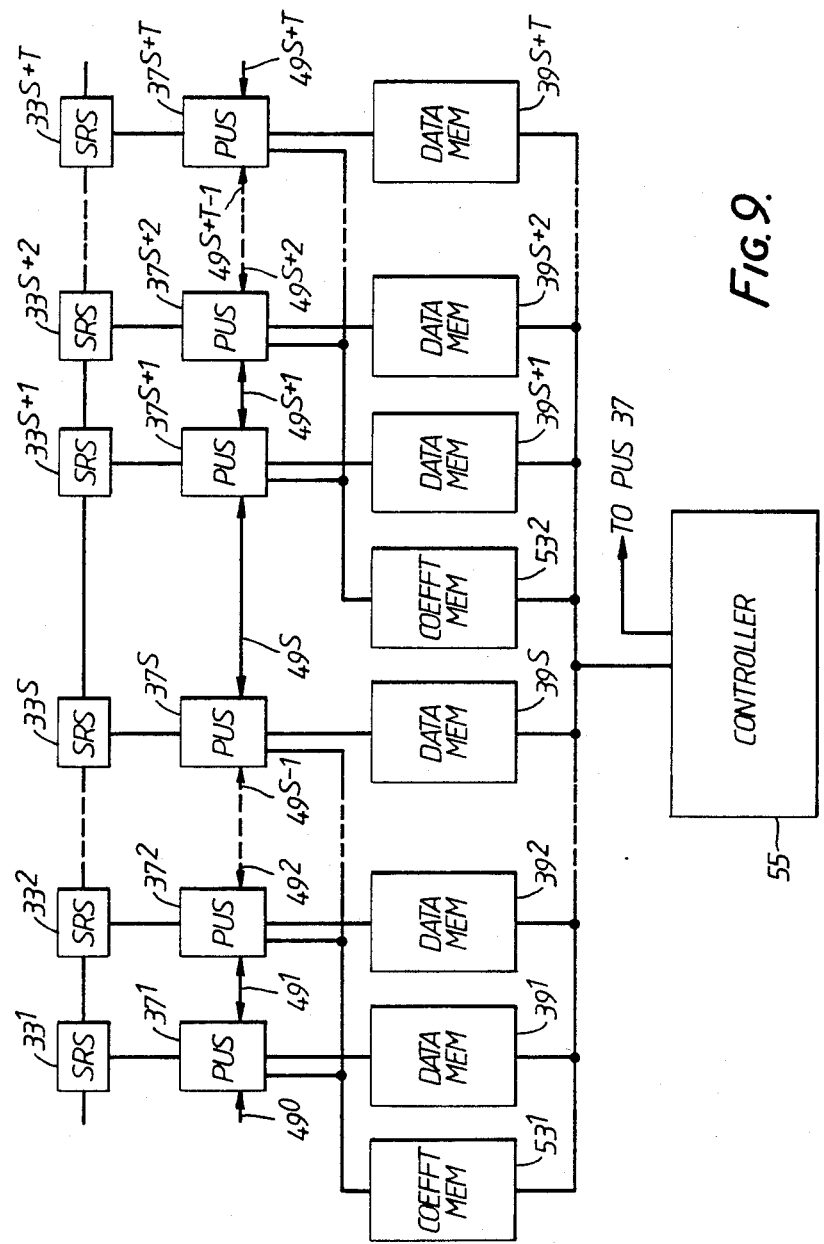
FIG. 9 is a block schematic diagram illustrating a further feature of the processor of FIG. 3.

FIG. 9 shows a view of the azimuth processor 25 equivalent to that of FIG. 5 but in which the same weighting coefficients stored in a memory $53^1$ are used by a set of APMs comprising the first S APMs 35, and the same weighting coefficients stored in a memory $53^2$, are used by a set of APMs comprising the next T APMs 35. The remaining APMs (not shown) are similarly grouped in further sets each set sharing a common coefficient memory (not shown). It will be appreciated that the number of APMs in each set may be chosen independently, according to the change of the required coefficients with range.

FIG. 9 also shows a single controller 55 which supplies all the control signals for the processor 25. The functions of the controller 55 are to provide the addresses of the required data in the data memory sections 39 and the coefficient memories 53, to provide initiation signals for the processing cycles and control signals to processing units 37. However, instead of a single controller, control may be distributed between several controllers, e.g. one for each set of APMs 35 sharing a common coefficient memory 53.

Figure 8:
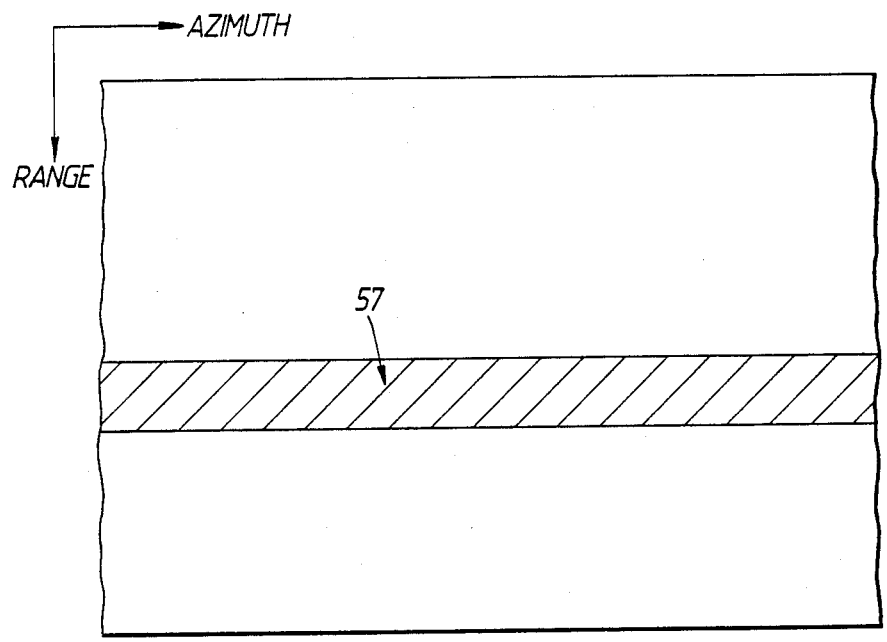

In operation of the system each APM 35 generates N of the total R data processed samples in a range line. Hence, each APM 35 generates image data for a fraction N/R of the total image produced as illustrated by the area 57 in FIG. 8. As a result, a fault in any one APM 35 will show up as degradation of a band only of the image, giving rise to graceful degradation, and relatively easy determination of which APM 35 is faulty.

Figure 10:
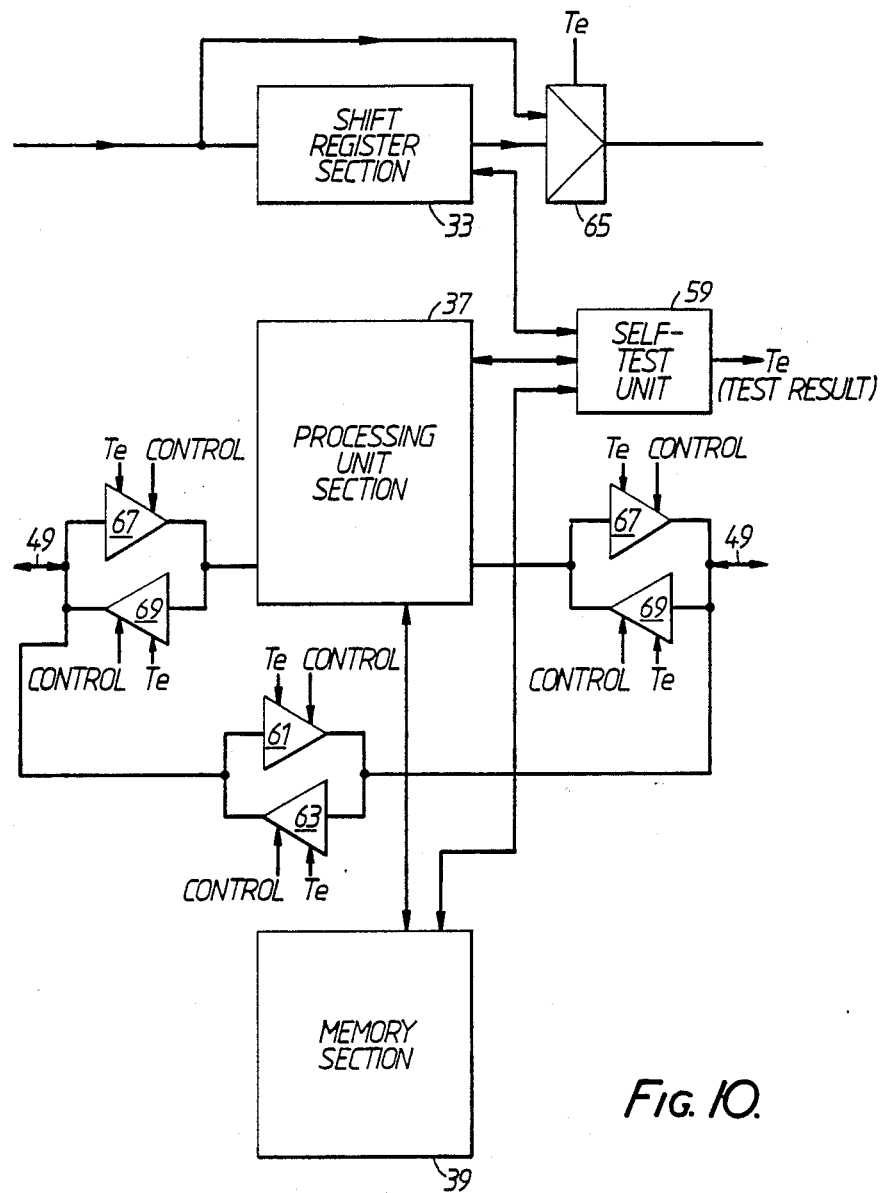
FIG. 10 illustrates a possible modification of the processor of FIG. 3.

Fault tolerance can easily be provided by arranging for a faulty APM 35 and its associated shift register section 33 to be by-passed. To this end, as illustrated in FIG. 10, each APM 35 may include a self-test unit 59 which checks whether the associated shift register section 33 and the processing unit section 37 and memory section 39 of the associated APM 35 are working correctly. Under normal operation, a multiplexer 65 selects the input from the shift register section 33 as the output and both of two tri-state drivers 61 and 63 are disabled. The processing unit 37 is connected to the interconnections 49 via tri-state drivers 67 and 69, with drivers 67 enabled and drivers 69 disabled for left to right data transfer and vice versa for right to left transfer. When the self-test unit 59 detects a fault the shift register section 33 is by-passed by appropriately operating the multiplexer 65. The processing unit section 37 is by-passed by disabling the drivers 67 and 69 and activating drivers 61 and 63; driver 61 being enabled and driver 63 being disabled for left to right data transfer and vice versa for right to left transfer. It will be appreciated that this testing and the subsequent activation of the by-pass circuitry may alternatively be carried out by the main control unit 55 instead of having a self test unit 57, either automatically or under the control of the user.

Such an arrangement of course results in a reduction of the width of the swath of terrain being imaged. To avoid this, the azimuth processor 25 may include several redundant APMs with associated shift register sections which may be substituted for any faulty APM/shift register section detected.

In addition to lending itself to fault tolerant design as described above, an azimuth processor according to the invention, since it comprises a number of processing module/shift register section assemblies operating in parallel on data relating to different sections of the range line data, can very easily be adapted to meet any desired swath width, and hence total image size requirements. Furthermore, since azimuth resolution is a function of azimuth integration interval, the azimuth resolution can easily be made fully programmable and adaptable to requirements.

To achieve very high throughputs with large integration intervals M, processing unit 31 may comprise two parts operating in parallel, each part carrying out processing of the data of a different set of M/2 successive range lines stored in memory 29. The R partially integrated results from one part of the processor are then respectively added to the R partially integrated results from the other part to give the required complete azimuth integration over M range lines.

A processor according to the invention also exhibits very smooth data flow properties since raw data enters the processor in range line order and exits the processor in range line order.

Since the processor, as shown in FIG. 5, consists of a linear array of identical azimuth processing modules (APMs) 35, it is relatively easy to design. The memory section 39 of each APM 35 can be implemented using conventional high density random access memory (RAM) components. Each processing unit section 37 and its associated shift register section 33 can be implemented as a custom designed integrated circuit device, using a technology such as Complementary Metal Oxide Silicon (CMOS) technology.

The design of the processor is also such that it can easily be arranged to take advantage of advances in technology. This and the above mentioned advantages can best be seen by an analysis of the throughput of data in the processor, as follows.

If each interpolator 45 produces a sample for feeding to an associated MAC 43 every clock cycle, the time taken by an interpolator 45 to generate all the samples required by its associated MACs 43 for a given range line input to the shift register 27 is $NM/f_c$ where $f_c$ is the clock frequency.

Each interpolator 45 is required to generate these samples in the time required to enter a new range line in the shift register 27.

i.e. $NM/f_c \leq R/f_s$ $$N \leq (R/M)(f_c/f_s) \qquad (1)$$

where $f_s$ is the output rate of samples from the range processor 23 so that $R/f_s$ is the time interval between two successive radar pulse transmissions.

Also, since each MAC 43 receives a new sample from the associated interpolator 45 every N clock cycles, the time $t_m$ available for each multiply-accumulate operation of the MACs is given by $$t_m \leq N/f_c \qquad (2)$$

For a typical satellite radar system with parameters $f_s = 10$ MHz, $R = 5000$ and $M = 1000$, using $f_c = 20$ MHz and using current CMOS technology, equations (1) and (2) lead to $N \leq 10$ and $t_m 500$ ns. Thus, using current CMOS technology, each integrated circuit device, comprising a processing unit section 37 and a shift register section 33 can process up to 10 range samples.

Improvements in technology will result in increases in circuit density which in turn will allow an increase of the number of multipliers and shift register stages that can be included in a single integrated circuit device, thereby enabling each integrated circuit device to process more range samples, i.e. increase in N. However, the value of N is limited by equation (1) above. Fortunately, an increase in circuit density can be expected to be associated with an increase in speed which will be reflected as an increase in $f_c$. Hence the upper limit to N, given by equation (1), will also increase with improvements in technology. For example, in the event of a doubling of the speed and circuit density of the technology, two integrated circuit devices, each containing a processing unit section 37 and a shift register section 33 of FIG. 5, can be replaced by a single integrated circuit device in the new technology, with the same pin configuration.

In practical terms, an azimuth processor having an architecture as proposed by the present invention can easily be upgraded in performance with improvements in technology by replacing the integrated circuit devices with ones having more processing power but the same pin configuration.

I claim:

1. An azimuth processor for a synthetic aperture radar system, which comprises a plurality of data processing modules, each associated with a different set of range line samples of the radar echo signals, each module including a memory to store the sets of samples from M successive range lines and data processing means for processing the samples contained in the memory for producing azimuth processed range line samples, and adjacent modules being interconnected so that samples required for processing by a module and not contained in its memory due to the range migration effect may be obtained from another module.

2. An azimuth processor as claimed in claim 1, in which control means are provided whereby successive sets of samples overwrite the oldest set of range line samples in the respective memories.

3. An azimuth processor as claimed in claim 2, in which shift register means is provided, the different stages of which are associated with different processing modules, into which successive samples of successive range line signals are clocked in range order, the control means being such as to transfer the clocked in samples to overwrite the oldest samples in the respective memories, and to transfer processed samples produced by the respective modules to a shift register means.

4. An azimuth processor as claimed in claim 3, in which the control means is arranged to transfer azimuth processed range line samples to the same shift register means into which the range line samples are clocked, the azimuth processed samples therein being clocked out when the next range line samples are clocked in.

5. An azimuth processor as claimed in claim 1, in which a range migration interpolator is provided for each module, connected to receive samples from one or more module memories in range order.

6. An azimuth processor as claimed in claim 5, in which each interpolator includes shift register means connected such that samples from the memories are clocked in range order.

7. An azimuth processor as claimed in claim 6, in which multiply accumulators are provided which are connected to $L+1$ stages of the shift register means to perform a weighted summation of $L+1$ samples to produce successive interpolated samples.

8. An azimuth processor as claimed in claim 6, in which the shift register means of adjacent modules are interconnected to enable samples to be clocked into the shift register means of an interpolator from the shift register means of an adjacent interpolator.

9. An azimuth processor as claimed in claim 8, in which the shift register means of each interpolator has an additional shift register means connected so that, while samples are being clocked into the shift register means from an adjacent shift register means, samples from a module memory can be clocked into the additional shift register means to be transferred together to the respective shift register means.

10. An azimuth processor as claimed in claim 5, in which each memory can be selectively connected so that it can be read out into the interpolator of its module or into the interpolator of an adjacent module.

11. An azimuth processor as claimed in claim 10, in which the coupling between interpolators of adjacent modules is bi-directional.

12. An azimuth processor for a synthetic aperture radar system comprises: a shift register arrangement into which successive samples of successive range line signals are clocked in range order as data already in the shift register is clocked out; a plurality of data processing modules each associated with a different set of successive stages of the shift register, each processing module including a respective memory which stores range line samples of M successive range line signals and data processing means for processing the samples contained in the associated said memory at any given time to produce azimuth processed range line samples; and control means whereby after each range line has been clocked into the shift register arrangement in each module, the clocked in range line samples in said set of successive stages of the shift register overwrite the oldest range line samples in said memory and processed range line samples produced by said processing module are inserted into the shift register; adjacent ones of said processing modules being interconnected so that any un-processed range line samples required for range migration interpolation by a module not stored in its associated memory may be obtained from another said module.

* * * * *